United States Patent [19]
Feldman

[11] Patent Number: 5,823,105
[45] Date of Patent: Oct. 20, 1998

[54] HAZARDOUS WASTE COMPACTION SYSTEM

[75] Inventor: Richard Feldman, Waverly, Nebr.

[73] Assignee: Eidos Corporation, Lincoln, Nebr.

[21] Appl. No.: 731,881

[22] Filed: Oct. 22, 1996

[51] Int. Cl.⁶ .................................................. B30B 9/30
[52] U.S. Cl. ...................................... 100/215; 100/229 R
[58] Field of Search .............................. 100/100, 229 R, 100/229 A, 215

[56] References Cited

U.S. PATENT DOCUMENTS

| | | |
|---|---|---|
| 2,622,748 | 12/1952 | Feidert . |
| 2,732,113 | 1/1956 | Rice ..................................... 100/229 R |
| 2,789,591 | 4/1957 | Benz . |
| 3,378,155 | 4/1968 | Steiner . |
| 3,438,523 | 4/1969 | Vik . |
| 3,463,079 | 8/1969 | Corbett ................................ 100/229 R |
| 3,726,211 | 4/1973 | Gladwin .............................. 100/229 A |
| 3,862,595 | 1/1975 | Longo ................................. 100/229 A |
| 3,869,978 | 3/1975 | Steinberg et al. .................. 100/229 A |
| 4,275,651 | 6/1981 | Groth et al. ........................ 100/229 A |
| 4,348,147 | 9/1982 | Helm . |
| 4,505,631 | 3/1985 | Warner et al. . |
| 4,554,868 | 11/1985 | Zimmer ............................... 100/229 R |
| 4,559,870 | 12/1985 | Krummacher et al. . |
| 4,620,479 | 11/1986 | Diamond et al. . |
| 4,946,331 | 8/1990 | Johnson . |

Primary Examiner—Stephen F. Gerrity
Attorney, Agent, or Firm—Hovey, Williams, Timmons & Collins

[57] ABSTRACT

A waste compacting apparatus is provided for compacting waste in a disposal barrel, and includes a frame on which a ram assembly is supported. The apparatus also includes a movable pallet for supporting the disposal barrel for movement through an opening in the frame between a compacting position in which the disposal barrel is aligned with a ram of the ram assembly, and a handling position outside the frame in which the disposal barrel is accessible for handling. The pallet includes a base plate on which the disposal barrel sits, and the base plate overlies a base of the frame in the compacting position so that the base plate and disposal barrel are supported on the base during compaction of the waste by the ram. A method of collecting and compacting waste in a disposal barrel is also provided, and includes the steps of collecting waste in a collection barrel, and moving the collection barrel onto a dumping apparatus. Waste from the collection barrel is dumped into the disposal barrel by pivoting a platform of the apparatus on which the collection barrel is supported. The disposal barrel is supported on a movable pallet, and is moved into the compacting apparatus when full of waste. Thereafter, the waste is compacted and the pallet is removed from the compacting apparatus so that additional uncompacted waste can be dumped into the disposal barrel. These steps are repeated until the disposal barrel is filled with compacted waste and prepared for disposal.

10 Claims, 4 Drawing Sheets

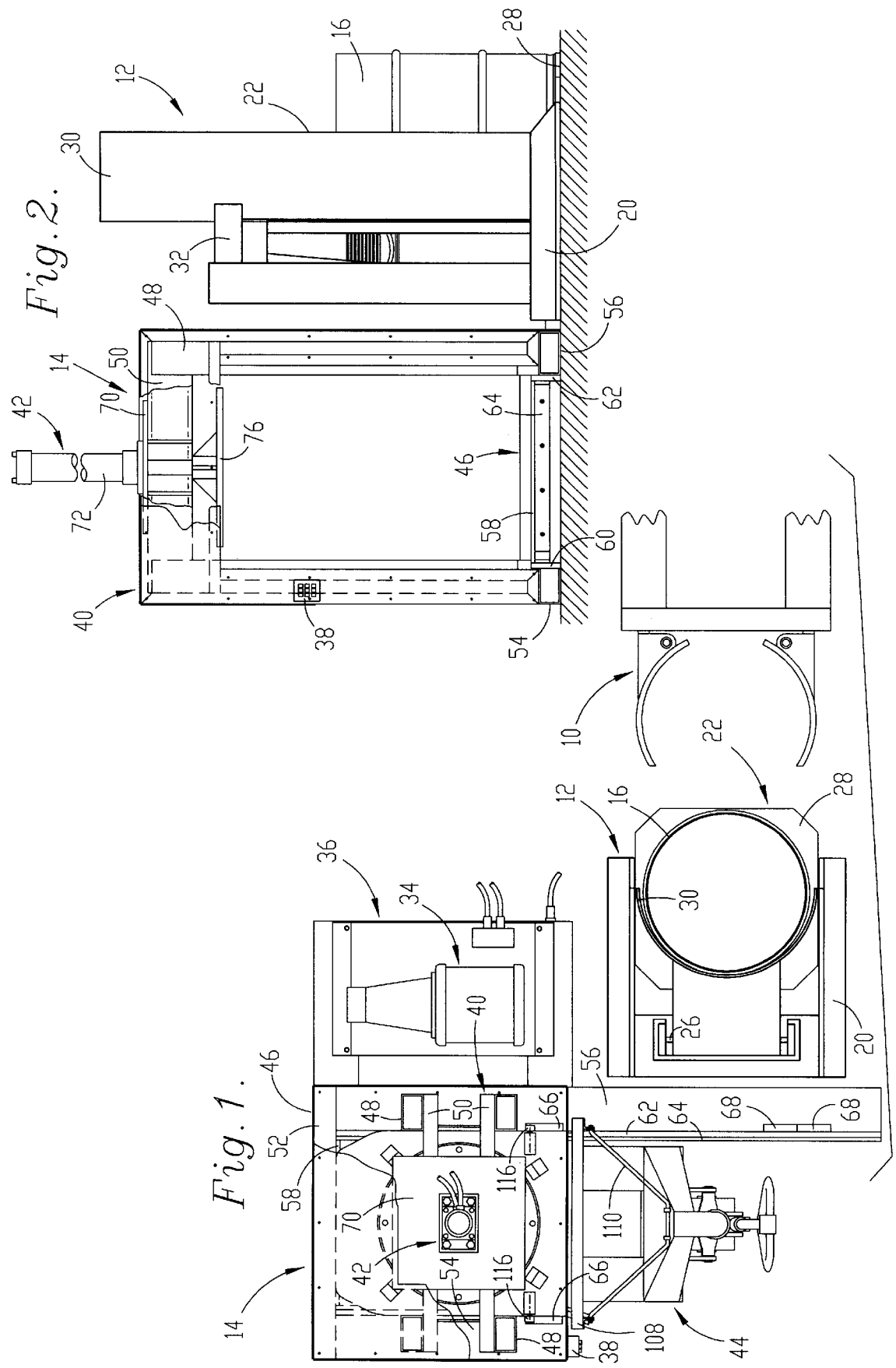

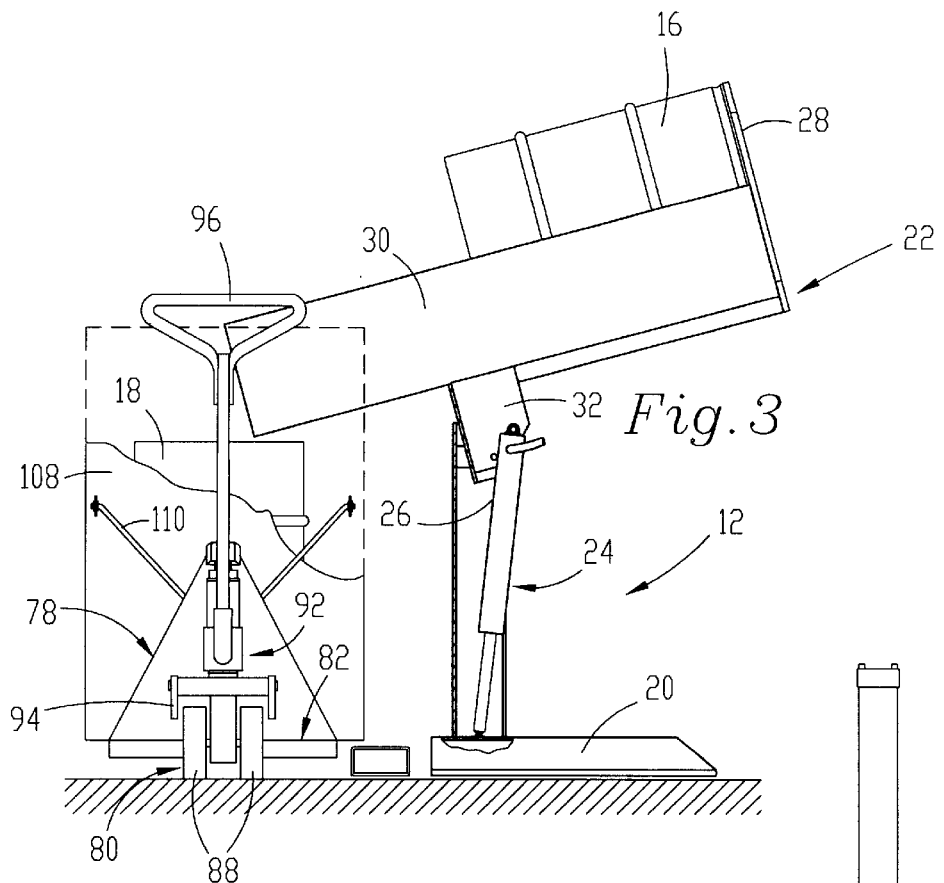
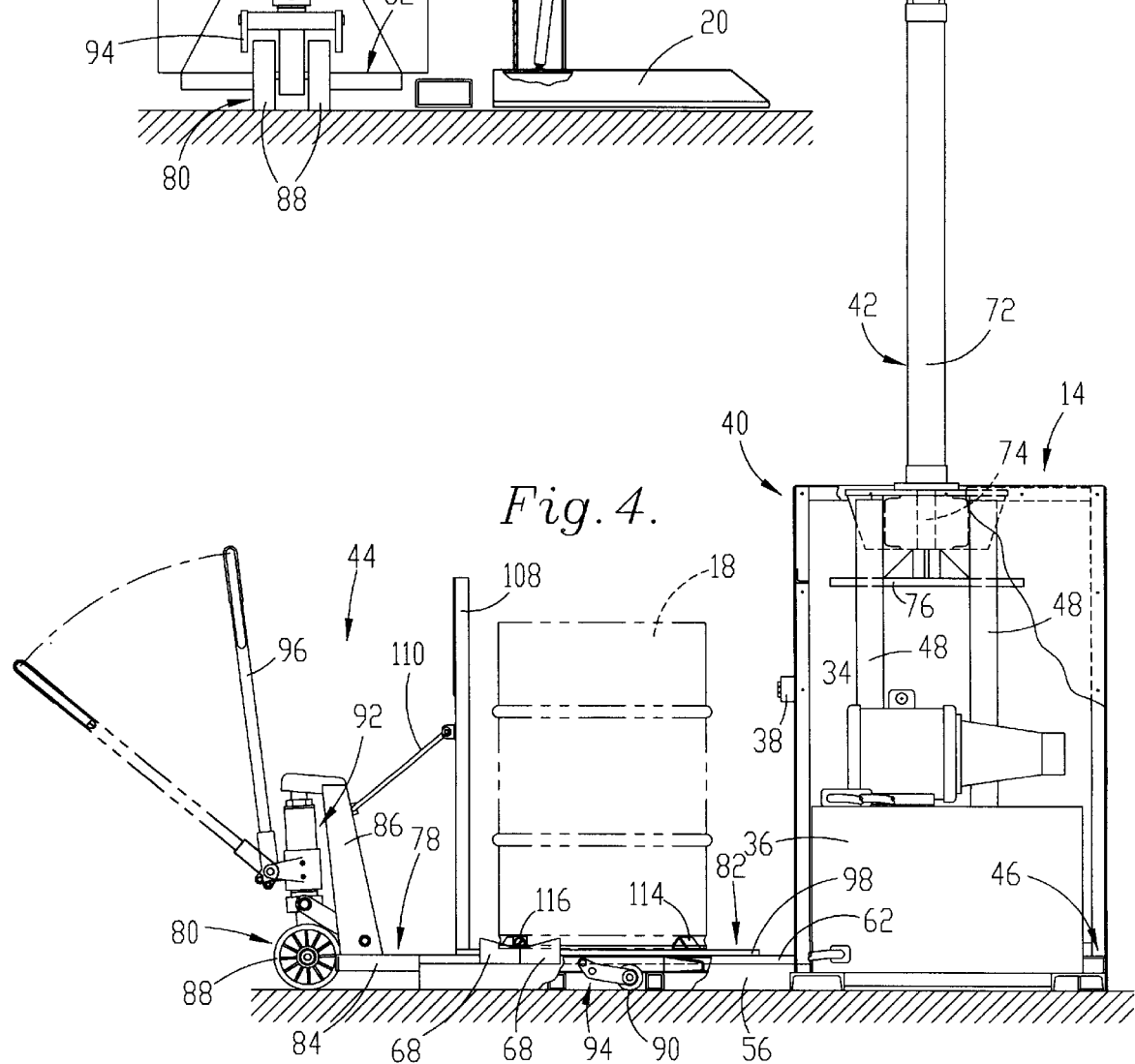

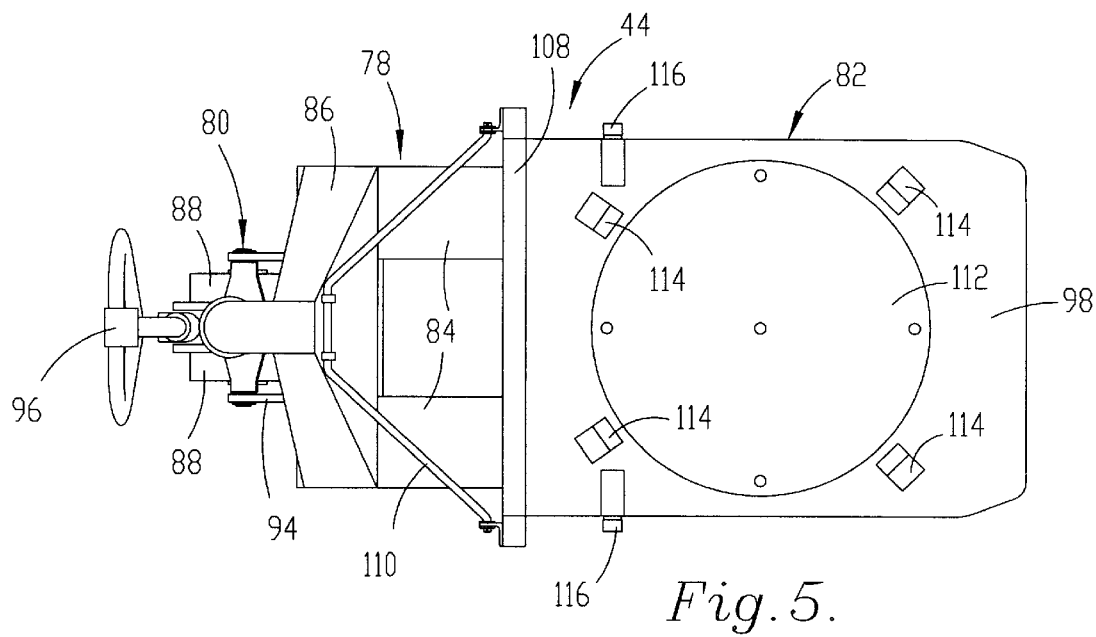
Fig. 5.
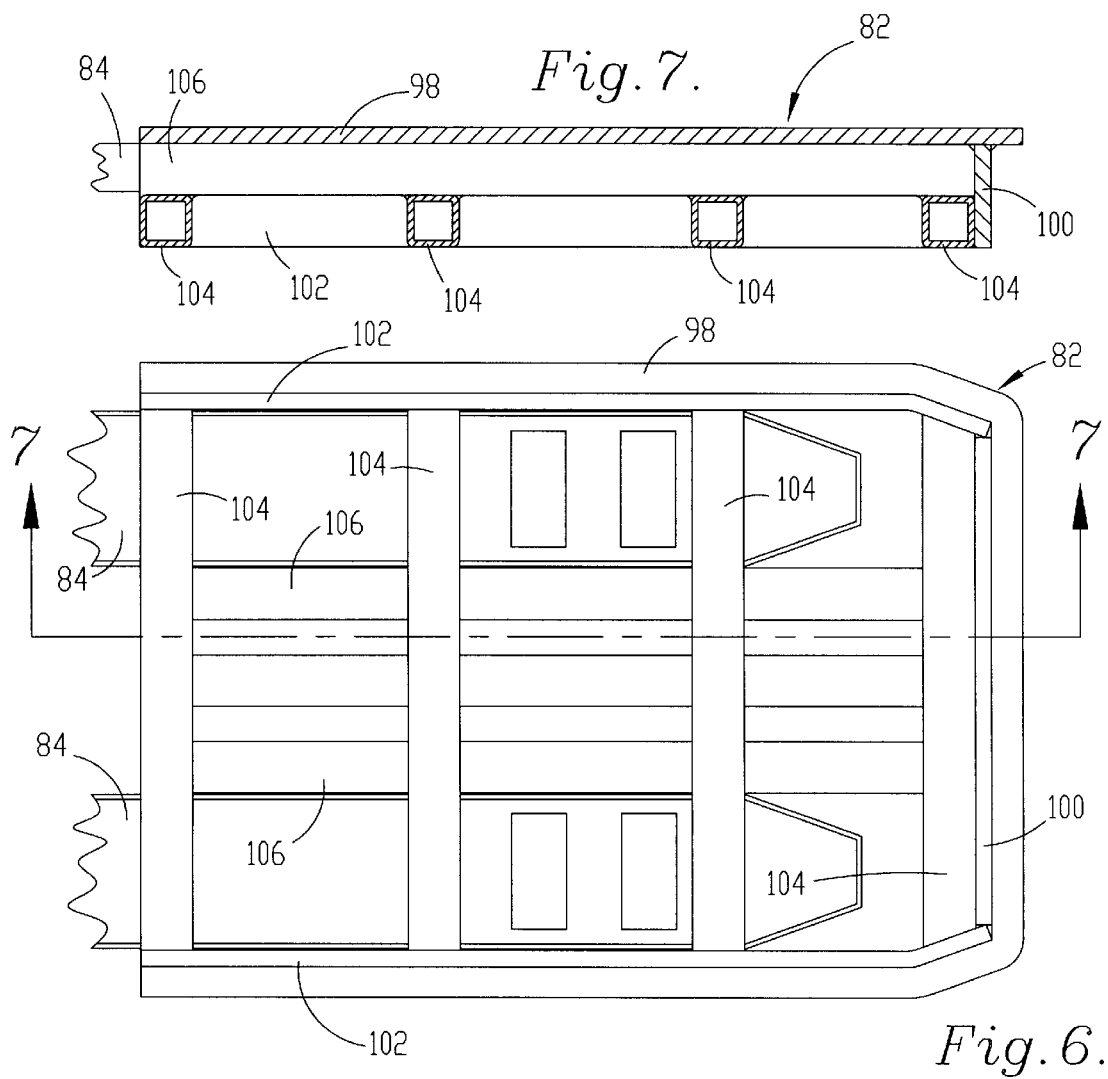
Fig. 7.
Fig. 6.

HAZARDOUS WASTE COMPACTION SYSTEM

BACKGROUND OF THE INVENTION

1. Field of the Invention

The present invention relates generally to waste handling equipment, and more particularly to a hazardous waste compaction system for collecting and compacting waste in disposal barrels so that each disposal barrel can be filled with as much waste as possible.

2. Discussion of the Prior Art

Government regulations mandate that various types of compactable hazardous waste be disposed of in a prescribed manner including placing the waste into disposal barrels, covering and sealing the barrels, and transporting the barrels to designated hazardous waste storage facilities. It is conventional for a manufacturer to comply with the regulations by placing special hazardous waste collection barrels throughout a manufacturing facility, and manually dumping the contents of these barrels into the disposal barrels that are then covered and sealed in the prescribed manner.

In the known collection and disposal method, once a disposal barrel has been filled with uncompacted waste from one or more collection barrels, the disposal barrel is manually placed in a compactor having a frame supported on the ground and a ram assembly including a ram that is shiftable between retracted and extended positions relative to the frame. Thereafter, the ram is actuated to compact the waste within the disposal barrel to make room for additional uncompacted waste. Thereafter, the disposal barrel is manually lifted from the compactor and refilled with uncompacted waste from the collection barrels, substantially increasing the amount of waste retained in the disposal barrel. Each time additional uncompacted waste is dumped into the disposal barrel, the barrel is manually lifted back into the compactor and the waste is compacted.

Once the disposal barrel is completely filled with compacted waste, it is covered and sealed and transported to an acceptable hazardous waste storage location. However, because waste is compacted in the disposal barrels, fewer barrels are required to store a given amount of waste than would otherwise be required if the waste were left uncompacted upon disposal.

Although the conventional method makes efficient use of the volume provided in each disposal barrel, a substantial amount of manual labor is required in order to practice the method. For example, the collection barrels are manually lifted in order to dump the waste therein into the disposal barrels, and this lifting operation is repeated after each compaction operation in order to refill the disposal barrel for further compaction. In addition, the disposal barrel must be lifted into and out of the compactor before and after each compaction operation, and becomes heavier and heavier as the barrel is filled with compacted waste, sometimes reaching a weight in excess of 400 lbs.

These manual steps increase the risk of injury to workers and present inefficient, nonergodynamic manual operations that reduce the productivity of workers performing such tasks. In addition, the conventional method requires workers handling the collection and disposal barrels to come into close contact with the hazardous waste, creating the need for special masks, glasses and gloves to protect the workers from exposure to the waste. Thus, many different health risks exist in the practice of the conventional method.

OBJECTS AND SUMMARY OF THE INVENTION

It is an object of the present invention to provide a system for collecting and compacting waste that reduces the amount of manual labor required to handle both collection barrels and disposal barrels such that the risk of back injuries and other health problems is substantially reduced.

It is another object of the invention to provide a compacting apparatus having a movable pallet which eliminates the need for manually lifting a disposal barrel into and out of a compacting position and facilitates repeated filling and compacting operations to maximize the amount of waste contained within each disposal barrel prior to covering and sealing thereof.

Yet another object of the invention is to provide a system in which a movable pallet shifts between a compacting position disposed within a compacting apparatus, and a dumping position aligned with a dumping apparatus so that waste can be dumped into a disposal barrel from a collection barrel, and then compacted.

In accordance with these and other objects evident from the following description of a preferred embodiment of the invention, a waste compacting apparatus is provided for compacting waste in a disposal barrel. The apparatus includes a frame supported on the ground and having a base and an upstanding portion, and a ram assembly supported on the upstanding portion of the frame and including a ram that is shiftable between retracted and extended positions. A movable pallet is provided for supporting the disposal barrel for movement through an opening in the frame between a compacting position in which the disposal barrel is aligned with the ram and a handling position outside the frame in which the disposal barrel is accessible for handling. The pallet includes a base plate on which the disposal barrel sits, and the base plate presents an edge that overlies the base in the compacting position so that the base plate and disposal barrel are supported on the base during compaction of the waste by the ram.

By providing a compacting apparatus in accordance with the present invention, numerous advantages are realized. For example, by providing a compacting apparatus having a movable pallet, a means is provided for easily shifting the disposal barrel between the compacting and handling positions, and the base plate of the pallet also functions as the floor of the compacting apparatus as the ram is extended into the disposal barrel to compact the waste therein. In addition, the movable pallet permits the disposal barrel to be moved between a dumping position and the compacting position such that uncompacted waste from collection barrels can be dumped into the disposal barrel between compacting operations.

In accordance with another aspect of the invention, a method of collecting and compacting waste in a disposal barrel is provided. The method includes the steps of collecting waste in a collection barrel, moving the collection barrel onto a dumping apparatus, and dumping the waste from the collection barrel into a disposal barrel that is supported on a movable pallet. Thereafter, the pallet is moved into a compacting apparatus where the waste is compacted in the disposal barrel by extending a ram into the disposal barrel. Once the compaction operation is complete, the pallet is moved out of the compacting apparatus and into alignment with the dumping apparatus, and additional uncompacted waste is dumped into the disposal barrel for compaction. Thus, the dumping, moving and compacting steps are repeated until the disposal barrel is substantially full of compacted waste, and is then covered, sealed, and removed from the pallet for disposal.

By providing this method, manual labor is substantially eliminated from the collecting and compacting operation, reducing the risk of injury and enabling workers to distance themselves from any potentially noxious fumes associated with the waste.

BRIEF DESCRIPTION OF THE DRAWING FIGURES

The preferred embodiment of the present invention is described in detail below with reference to the attached drawing figures, wherein:

FIG. 1 is a top plan view of a hazardous waste compaction system constructed in accordance with the preferred embodiment;

FIG. 2 is a front elevational view of a dumping apparatus and a compacting apparatus forming a part of the system;

FIG. 3 is a front elevational view of the dumping apparatus and of a pallet forming a part of the system;

FIG. 4 is a side elevational view of the compacting apparatus, illustrating the pallet in a handling position;

FIG. 5 is a top plan view of the pallet;

FIG. 6 is a fragmentary bottom plan view of the pallet;

FIG. 7 is a fragmentary sectional view of the pallet taken along line 7—7 of FIG. 6;

DETAILED DESCRIPTION OF THE PREFERRED EMBODIMENT

Figure 9:
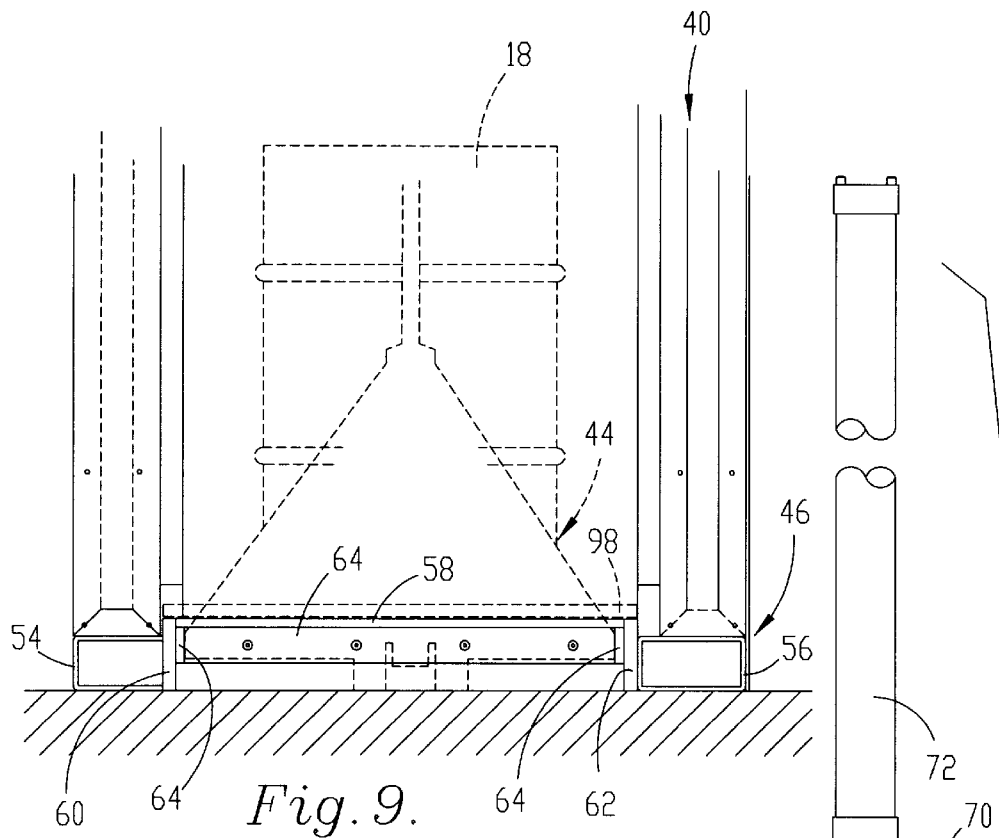
FIG. 9 is a fragmentary front elevational view of a frame forming a part of the compacting apparatus, illustrating particular details of the frame.

A system for collecting and compacting hazardous waste is shown in FIG. 1, and broadly includes a barrel handling device 10, a dumping apparatus 12, and a compacting apparatus 14. The system is designed for use with collection barrels 16 within which uncompacted hazardous waste is collected, and disposal barrels 18 within which the waste is compacted for disposal.

The collection and disposal barrels in the preferred embodiment are identical to one another, each being of conventional configuration and size. An example of a suitable barrel is a 55-gallon steel drum or the like capable of being covered and sealed to prevent leakage of fluids from the drum during storage. However, other barrel constructions can be employed without departing from the scope of the invention.

The barrel handling device 10 is also conventional, and includes a forklift provided with a pair of articulating arms capable of gripping one of the collection or disposal barrels and lifting the barrel for transportation between various locations. An example of a suitable barrel handling device is illustrated in U.S. Pat. No. 3,438,523, to Vik, the disclosure of which is incorporated herein. Another suitable type of barrel handling device includes a manually operated pallet having a pair of articulating arms such that once a barrel is gripped and lifted by the arms, the device is manually rolled from location to location.

The dumping apparatus 12 is shown in FIG. 3, and broadly includes a frame 20 supported on the floor of the manufacturing facility in the vicinity of the compacting apparatus, a platform 22 supported on the frame for pivoting movement about a horizontal axis, and a hydraulic piston-and-cylinder assembly 24 connected between the frame and the platform for carrying out pivoting movement of the platform.

The frame 20 of the dumping apparatus includes a base that rests on the floor, and a pair of laterally spaced upstanding side walls. A pivot pin 26 extends between and is connected to the side walls of the frame, and supports the platform 22 for pivoting movement between an upright orientation as shown in FIG. 1, and an overturned orientation as shown in FIG. 3. The total range of pivoting movement of the platform is greater than 90° so that waste in the collection barrel 16 carried on the platform is dumped from the barrel when the platform is pivoted to the dumping position.

As shown in FIG. 1, the platform 22 includes a bottom plate 28 sized for receipt of the collection barrel, and a semi-cylindrical side wall 30 presenting a diameter slightly larger than the diameter of the collection barrel. As shown in FIG. 3, the side wall 30 is of a height greater than that of the collection barrel 16, and defines a trough for guiding waste from the collection barrel into the disposal barrel 18 during dumping. A pair of arms 32 protrude from the rear of the side wall 30 and receive the pivot pin 26 to permit pivoting movement of the platform, as described.

The hydraulic piston-and-cylinder assembly 24 includes a cylinder connected at one end by a pivot pin to the arms 32 of the platform 22 at a location spaced from the pivot pin 26, and a piston connected at one end by a pivot pin to the frame 20. Preferably, the assembly 24 is single acting, wherein a single line is provided for supplying fluid under pressure to one end of the cylinder to pivot the platform to the dumping position, and gravity returns the platform to the upright position when the fluid pressure is relieved. As shown in FIG. 1, a conventional pump 34 is provided for supplying the fluid under pressure, as is a fluid reservoir 36. A control pad 38 is provided on the frame of the compacting apparatus for controlling operation of both the dumping apparatus and the compacting apparatus.

The compacting apparatus 14 broadly includes a frame 40 that is supported on the floor of the facility adjacent the dumping apparatus, a ram assembly 42 supported on the frame, and a pallet 44 that is movable into and out of a compacting position disposed within the frame. The frame includes a base 46, a plurality of upstanding tubular members 48, and a pair of transverse frame elements 50 connected between the upstanding members 48 at the top ends of the members. The base presents a J-shaped profile when viewed from above and includes a tubular rear member 52, and a pair of laterally spaced tubular side members 54, 56. The rear member presents first and second axial ends, and each of the side members 54, 56 extend from the ends in a direction transverse to the member 52, defining the sides of the frame.

The three base members 52, 54, 56 together define an interior of the frame and present a front opening through which the pallet 44 is movable in order to position the disposal barrel beneath the ram assembly. The side member 56 protrudes beyond the opening and defines a side rail for guiding movement of the pallet between a compacting position as shown in FIG. 1, wherein the disposal barrel is aligned with the ram assembly, and a dumping or handling position, shown in FIG. 4, that is removed from the compacting apparatus and aligned with the dumping apparatus.

As shown in FIG. 2, each of the tubular base members present an inner side wall to which an elongated steel plate 58, 60, 62 are secured. The plates protrude above the tubular base members and present an upper bearing surface that extends along the interior of the frame. A strip 64 of wear material such as rubber or the like is fastened to the inner surface of the plates 58, 60, 62 by threaded fasteners or the like, and protect the plates from wear during use of the apparatus. As shown in FIG. 1, the plate 62 extends along the member 56 beyond the opening of the compacting apparatus, and defines an upper bearing surface adjacent both the compacting and handling positions of the pallet. The strip 64 also extends along the entire length of the member 56.

Figure 8:
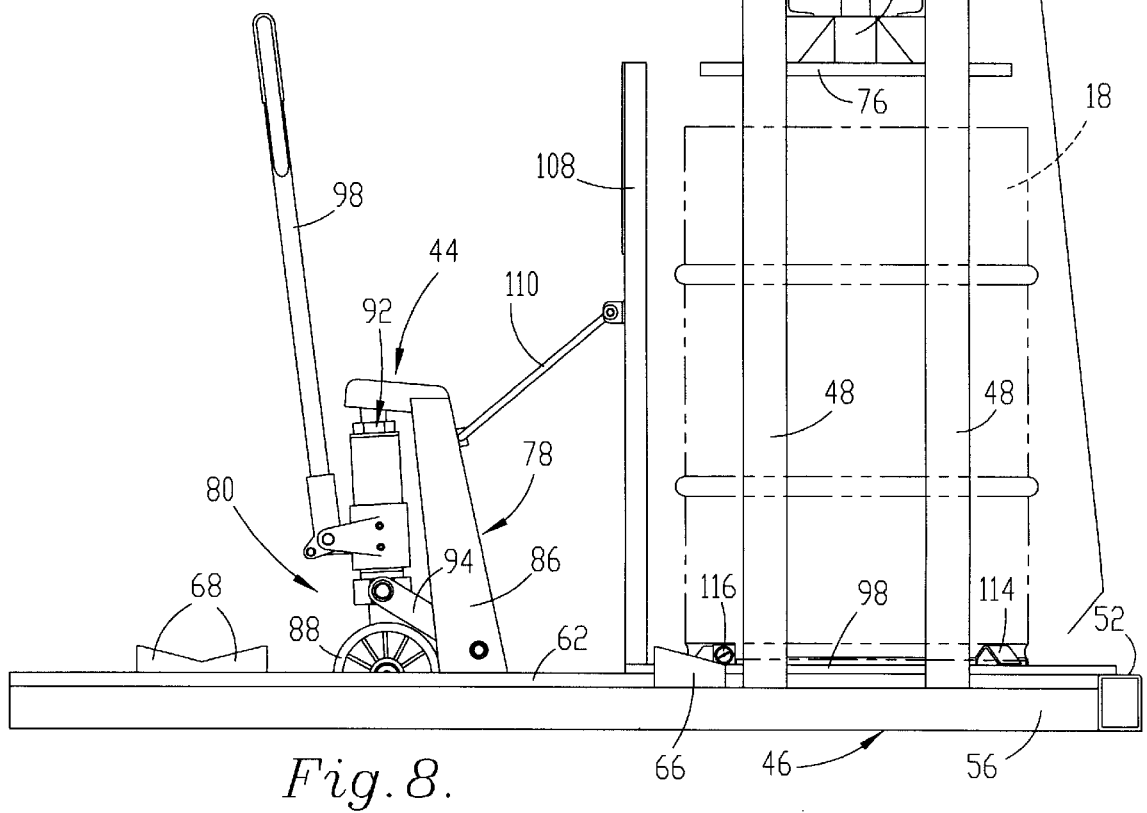
FIG. 8 is a side elevational view of the compacting apparatus, illustrating the pallet in a compacting position.

As shown in FIG. 1, ramps 66 are provided on the side members 54, 56 just inside the opening of the frame, and each ramp presents a raised end adjacent the opening and a lower end spaced from the opening, as shown in FIG. 8. As described below, the ramp forms a part of a registration means for aligning the pallet and disposal barrel with the ram assembly when the pallet is moved to the compacting position. As shown in FIG. 4, an additional pair of ramps 68 are mounted on the side member 56 adjacent the distal end thereof, and are arranged with the lower ends of the ramps abutting one another so that the ramps cooperate to form a part of a registration means for aligning the pallet and disposal barrel with the dumping apparatus when the pallet is moved to the handling position.

Returning to FIG. 1, the ram assembly 42 is supported on a plate 70 that, in turn, is secured to the frame elements 50. As shown in FIG. 4, the ram assembly includes a hydraulic cylinder 72 that is secured to the plate 70, and a ram or piston 74 received in the cylinder and shiftable between retracted and extended positions. Preferably, the ram assembly 42 is double acting, wherein a fluid line is connected to each end of the cylinder for supplying fluid under pressure to the cylinder to raise and lower the ram between the retracted and extended positions. The lines are connected to the fluid reservoir 36 through the hydraulic pump 34 in a conventional manner, and the control pad 38 includes controls for selectively supplying fluid under pressure to one line or the other to control movement of the ram during operation of the compacting apparatus.

The ram 74 presents a lower end that protrudes from the cylinder, and a circular head 76 is secured to the lower end of the ram. The head presents a generally flat lower surface that is circular in shape and of a diameter slightly smaller than the inner diameter presented by the disposal barrel. Thus, when a disposal barrel is positioned in the compacting position shown in FIG. 1, and fluid is supplied to the upper end of the cylinder, the ram is extended into the disposal barrel and compacts any waste therein.

The pallet 44 generally includes a chassis 78, a carriage 80 suspended from the chassis for supporting the pallet for rolling movement relative to the frame between the compacting and handling positions, and a base plate assembly 82 that is mounted on the chassis for supporting the disposal barrel on the pallet.

In the preferred embodiment, the chassis presents a longitudinally extending fork 84 and an upstanding rear portion 86. The carriage 80 includes front and rear roller pairs 88, 90 on which the pallet is supported for rolling movement across the floor, and a means for raising and lowering the chassis on the carriage, wherein the means includes a piston-and-cylinder assembly 92 supported by the rear portion 88 of the chassis, and a linkage 94 extending between the piston-and-cylinder assembly 92 and the front pair of rollers 90. A cylinder of the assembly 92 remains fixed on the chassis and the piston of the cylinder is connected to the rear pair of rollers 88 and to the linkage 94. As such, extension and retraction of the piston raises and lowers the chassis on the rollers.

A handle 96 forms a part of the piston-and-cylinder assembly 92, and includes an actuator for supplying pressure to one end of the cylinder when the handle is depressed such that the piston is extended. As a result, when the handle is pressed downward to the position shown in phantom line in FIG. 4, the chassis is lifted to a raised position in which the pallet can be easily rolled across the floor. When the handle is released and returns to the upper position shown in FIG. 4, the piston is retracted and the wheels are withdrawn up into the chassis, lowering the chassis to the ground.

As shown from the bottom in FIG. 6, the base plate assembly 82 includes a planer, horizontally extending base plate 98, a front wall 100 welded to the underside of the base plate along the front edge thereof, a pair of laterally spaced side walls 102 welded to the underside of the base plate and extending along the side edges thereof, and a plurality of transverse frame elements 104 welded between the side walls and spaced from the underside of the base plate by a distance sufficient to accommodate receipt of the fork of the chassis, as shown in FIG. 7. Longitudinally extending frame elements 106 are also provided within the space between the underside of the base plate and the transverse frame elements, and further define the space within which the fork of the chassis 78 is received so that the base plate assembly is substantially fixed to the chassis against relative movement.

The front and side walls 100, 102 of the base plate assembly are inset from the front and side edges of the base plate 98 in order to define a lip or flange that extends along the front and side edges of the base plate. As described below, this flange bears on the upper bearing surface of the base when the pallet is positioned within the compacting apparatus, as shown in FIG. 9, so that the base plate forms a floor of the frame and supports the disposal barrel during a compacting operation.

As shown in FIG. 3, a door 108 is secured to the base plate adjacent the rear end thereof, and extends upward in a generally vertical plane. The door is of a size and shape corresponding to that of the opening in the frame 40, and is positioned on the base plate assembly so that when the pallet is moved to the compacting position within the frame, as shown in FIG. 1, the door closes off the opening to prevent waste from being splattered during a compacting operation. The door is secured in place by an elongated, C-shaped rod 110 that is secured at the ends thereof to the door and along the length thereof to the upstanding rear portion of the chassis. In this manner, the door remains fixed relative to the pallet, presenting a protective shield between a pallet operator and the disposal barrel.

As shown in FIG. 5, the base plate assembly includes a circular support plate 112 that is secured to the top of the base plate by suitable fasteners. The support plate is of a diameter slightly smaller than the inner diameter of the barrel, and is received in the bottom of the disposal barrel to support the bottom wall of the barrel during a compacting operation. Without providing the support of the plate 112 against the bottom wall of the disposal barrel 18, the ram would ruin the barrel by pushing out the bottom. Four L-shaped support flanges 114 are welded or otherwise secured to the top of the base plate around the circumference of the circular support plate 112. Each flange is spaced from the circumference of the support plate by a distance slightly greater than the thickness of the side wall of the disposal barrel so that the disposal barrel can be placed over the circular support plate and within the space defined by the flanges.

A pair of rollers 116 are mounted on the base plate 98, wherein each roller protrudes beyond one of the side edges of the base plate adjacent the rear end of the base plate. These rollers are positioned on the pallet to register the pallet with the ram assembly in the compacting position of the pallet and with the dumping apparatus in the handling position of the pallet. As shown in FIG. 1, such registration is obtained through the provision of the ramps 66, 68 which are engaged by the rollers in each of the noted positions of the pallet, and which guide the rollers into proper registration as the chassis of the pallet is lowered from the raised position thereof.

In use of the preferred system, one or more collection barrels 16 are located throughout a facility in which hazardous waste is generated such that the waste is collected in the barrels. Once a collection barrel is full of uncompacted waste, the barrel handling device 10 is used to transport the barrel to an area in which the dumping and compacting apparatuses 12, 14 are set up, and to load it onto the platform 22 of the dumping apparatus.

Thereafter, with the pallet 44 in the handling position shown in FIG. 3, and with an empty disposal barrel 18 supported on the base plate, the piston-and-cylinder assembly 24 is actuated to pivot the platform to the position shown in FIG. 3, dumping the contents of the collection barrel into the disposal barrel. Because both barrels are the same size in the preferred embodiment, most if not all of the waste in the collection barrel will be transferred.

Returning to FIG. 1, with the disposal barrel 18 full of waste, the handle 96 of the pallet is depressed to lift the chassis onto the wheels so that the pallet can be rolled into the compacting apparatus. As the chassis is lifted, the rollers 116 on the base plate assembly are lifted over the tops of the ramps 66, 68 to permit the chassis to move freely between the handling and compacting positions. The side member 56 guides movement of the pallet, but does not restrict the pallet from being moved away from the apparatuses 12, 14 in any direction desired by the worker. As such, the pallet 44 is independent of the dumping and compacting apparatuses, and can be used to transport the disposal barrel to any location desired.

Once the pallet 44 is positioned in the compacting position shown in FIG. 8, the handle is released and allowed to return to the raised position, lowering the chassis to the ground. As this movement occurs, the rollers 116 engage the ramps 66 to bias the pallet completely into the compacting apparatus, and register the disposal barrel 18 with the head 76 of the ram assembly. The controls on the control pad 38 are then used to actuate the ram assembly 42, extending the ram 74 down into the disposal barrel to compact the waste, and thereafter retracting the ram to the upper position.

With compaction of the waste in the disposal barrel completed, the chassis 78 is again raised so that the rollers 116 clear the ramps 66 and the pallet can be moved back to the handling position shown in FIG. 4, in alignment with the dumping apparatus. When the chassis is again lowered, the rollers 116 engage the ramps 68 to register the disposal barrel with the chute defined by the platform, as shown in FIG. 3, so that when another collection barrel is positioned on the platform, the waste from the collection barrel can be dumped into the free space remaining in the disposal barrel. Once the disposal barrel is again filled, another compacting operation is carried out, leaving less space free in the disposal barrel after each operation until such time as the disposal barrel is filled with compacted waste.

Thereafter, the disposal barrel is covered and sealed, and the barrel handling device 10 is used to transport the disposal barrel to a truck or other means for disposing of the barrel.

An empty disposal barrel is then placed on the pallet and the collecting and compacting procedure is repeated.

Although the present invention has been described with reference to the preferred embodiment, it is noted that equivalents may be employed and substitution made herein without departing from the scope of the invention as recited in the claims. For example, although the pallet in the preferred embodiment is freely movable relative to the dumping and compacting apparatuses, it is possible to substitute a pallet having more restricted movement. For example, it is possible to mount the pallet on rails that guide movement thereof between the compacting and handling positions, or to provide other means for moving the disposal barrel into and out of the compacting apparatus in such a way that it is not necessary for the workers to manually lift and handle the barrels between each compacting operation.

What is claimed is:

1. A waste compacting apparatus for compacting waste in a disposal barrel, comprising:

a frame supported on the ground and including a base and an upstanding portion, the frame presenting an opening;

a ram assembly supported on the upstanding portion of the frame and including a ram that is shiftable between retracted and extended positions; and a movable pallet for supporting the disposal barrel for movement through the opening between a compacting position in which the disposal barrel is aligned with the ram and a handling position outside the frame in which the disposal barrel is accessible for handling, the pallet including a base plate on which the disposal barrel sits, the base plate presenting an edge that overlies the base in the compacting position so that the base plate and disposal barrel are supported on the base during compaction of the waste by the ram, said pallet including a chassis on which the base plate is supported, and a carriage suspended from the chassis for supporting the pallet for rolling movement relative to the frame between the compacting and handling positions, said carriage including a plurality of rollers and a suspension for shifting the rollers between a raised position in which the chassis is lowered relative to the frame and a lowered position in which the chassis is raised relative to the frame.

2. A waste compacting apparatus as recited in claim 1, wherein the pallet includes an actuating means for actuating the suspension to shift the rollers between the raised and lowered positions.

3. A waste compacting apparatus as recited in claim 2, wherein the actuating means includes a handle by which the pallet can be manipulated.

4. A waste compacting apparatus as recited in claim 1, further comprising a registration means for registering the disposal barrel beneath the ram when the pallet is moved to the compacting position and the chassis is lowered.

5. A waste compacting apparatus as recited in claim 4, wherein the registration means includes a ramp supported on the frame and a roller supported on the pallet, the roller engaging the ramp to move the disposal barrel into registration with the ram when the pallet is moved to the compacting position and the chassis is lowered.

6. A waste compacting apparatus as recited in claim 1, wherein the frame includes a side rail extending from the opening along the base to guide movement of the pallet between the compacting and handling positions.

7. A waste compacting apparatus as recited in claim 1, wherein the base plate includes a circular support plate over which the disposal barrel is received on the base plate, and at least one upstanding flange for positioning the disposal barrel relative to the support plate, the disposal barrel being removable from the pallet for disposal.

8. A waste compacting apparatus as recited in claim 1, wherein the pallet includes a door for closing off the opening in the frame when the disposal barrel is moved to the compacting position.

9. A waste compacting apparatus as recited in claim 1 further including apparatus for transferring waste from a collection barrel to a disposal barrel, and including a dumping apparatus for dumping uncompacted waste from the collection barrel into the disposal barrel, the dumping apparatus including a frame, a platform supported on the frame for pivoting movement about a horizontal axis, and a means for pivoting the platform about the horizontal axis between an upright orientation and an overturned orientation to dump waste from the collection barrel.

10. A waste compacting apparatus for compacting waste in a disposal barrel, comprising:

a frame supported on the ground and including a base and an upstanding portion, the frame presenting an opening;

a ram assembly supported on the upstanding portion of the frame and including a ram that is shiftable between retracted and extended positions;

a movable pallet for supporting the disposal barrel for movement through the opening between a compacting position in which the disposal barrel is aligned with the ram and a handling position outside the frame in which the disposal barrel is accessible for handling, the pallet including a base plate on which the disposal barrel sits, the base plate presenting an edge that overlies the base in the compacting position so that the base plate and disposal barrel are supported on the base during compaction of the waste by the ram, alignment means on the pallet engageable with registration means on the base for aligning the disposal barrel with the ram when the disposal barrel is in the compacting position thereof; and means engageable with the pallet for lifting the latter with the disposal barrel thereon, shifting the pallet with the disposal barrel thereon into overlying relationship with the base plate causing the alignment means to engage the registration means and effecting alignment of the disposal barrel with the ram.

\* \* \* \* \*